(12) United States Patent
Dimakis et al.

(10) Patent No.: US 7,547,488 B2
(45) Date of Patent: Jun. 16, 2009

(54) ORIENTED STRAND BOARD PANEL HAVING IMPROVED STRAND ALIGNMENT AND A METHOD FOR MAKING THE SAME

(75) Inventors: Alkiviades G. Dimakis, Federal Way, WA (US); Roger M. Shantz, Mercer Island, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 153 days.

(21) Appl. No.: 11/012,910

(22) Filed: Dec. 15, 2004

(65) Prior Publication Data

US 2006/0127634 A1 Jun. 15, 2006

(51) Int. Cl.
  *B32B 5/12* (2006.01)
(52) U.S. Cl. .................. 429/105; 428/111; 428/112; 428/113; 428/114; 428/292.4
(58) Field of Classification Search ................. 428/111, 428/112, 113, 114, 292.4
  See application file for complete search history.

(56) References Cited

U.S. PATENT DOCUMENTS

| | | | |
|---|---|---|---|
| 2,309,702 A | 2/1943 | Kirschenbaum | |
| 2,502,809 A | 4/1950 | Vogelsang | |
| 2,809,772 A | 10/1957 | Weisz | |
| 3,034,905 A | 5/1962 | Weintraub et al. | |
| 3,098,320 A | 7/1963 | Estkowski | |
| 3,545,129 A | 12/1970 | Schreiber et al. | |
| 3,688,437 A | 9/1972 | Hamrin | |
| 3,690,034 A | 9/1972 | Knapp | |
| 3,734,987 A | 5/1973 | Hamrin | |
| 3,850,753 A | 11/1974 | Chibata et al. | |
| 4,147,930 A | 4/1979 | Browne et al. | |

(Continued)

FOREIGN PATENT DOCUMENTS

CA 1241552 9/1988

(Continued)

OTHER PUBLICATIONS

Adlercreutz, P., and B. Mattiasson, "Oxygen Supply to Immobilized Biocatalysts. A Model Study," *Acta Chem. Scand.* B36:651-653, 1982.

(Continued)

*Primary Examiner*—Jane Rhee
(74) *Attorney, Agent, or Firm*—Weyerhaeuser IP Department; Rachael Vaughn

(57) ABSTRACT

An oriented strand board panel and a method for making the same are provided. The OSB panel has at least three layers, namely, a top surface layer, a core layer, and a bottom surface layer. A first cover layer may be provided on the top surface layer. Likewise, a second cover layer may be provided underneath the bottom surface layer. The first cover layer and/or the second cover layer may have a smaller strand angle, defined by an average deviation of strands from a longitudinal axis, than the top surface layer and the bottom surface layer. The smaller strand angles for the first cover layer and/or the second cover layer provide the OSB panel with greater stiffness and strength along the strong direction of the panel without significant compromise of strength and/or stiffness in the weak direction of the panel.

18 Claims, 8 Drawing Sheets

U.S. PATENT DOCUMENTS

| | | | |
|---|---|---|---|
| 4,166,006 A | 8/1979 | Hertl et al. | |
| 4,252,827 A | 2/1981 | Yokoyama et al. | |
| 4,364,984 A * | 12/1982 | Wentworth | 428/106 |
| 4,465,017 A | 8/1984 | Simmons | |
| 4,562,663 A | 1/1986 | Redenbaugh | |
| 4,583,320 A | 4/1986 | Redenbaugh | |
| 4,615,141 A | 10/1986 | Janick et al. | |
| 4,628,633 A | 12/1986 | Nilsson | |
| 4,665,648 A | 5/1987 | Branco et al. | |
| 4,715,143 A | 12/1987 | Redenbaugh et al. | |
| 4,769,945 A | 9/1988 | Motoyama et al. | |
| 4,777,762 A | 10/1988 | Redenbaugh et al. | |
| 4,777,907 A | 10/1988 | Sänger | |
| 4,779,376 A | 10/1988 | Redenbaugh | |
| 4,780,987 A | 11/1988 | Nelsen et al. | |
| 4,802,305 A | 2/1989 | Kojimoto et al. | |
| 4,802,905 A | 2/1989 | Spector | |
| 4,806,357 A | 2/1989 | Garrett et al. | |
| 4,808,430 A | 2/1989 | Kouno | |
| 4,866,096 A | 9/1989 | Schweighardt | |
| 4,879,839 A | 11/1989 | Gago et al. | |
| 5,010,685 A | 4/1991 | Sakamoto et al. | |
| 5,044,116 A | 9/1991 | Gago et al. | |
| 5,181,259 A | 1/1993 | Rorvig | |
| 5,183,757 A | 2/1993 | Roberts | |
| 5,236,469 A | 8/1993 | Carlson et al. | |
| 5,250,082 A | 10/1993 | Teng et al. | |
| 5,258,132 A | 11/1993 | Kamel et al. | |
| 5,284,765 A | 2/1994 | Bryan et al. | |
| 5,427,593 A | 6/1995 | Carlson et al. | |
| 5,451,241 A | 9/1995 | Carlson et al. | |
| 5,464,769 A | 11/1995 | Attree et al. | |
| 5,529,597 A | 6/1996 | Iijima | |
| 5,564,224 A | 10/1996 | Carlson et al. | |
| 5,565,355 A | 10/1996 | Smith | |
| 5,666,762 A | 9/1997 | Carlson et al. | |
| 5,680,320 A | 10/1997 | Helmer et al. | |
| 5,687,504 A | 11/1997 | Carlson et al. | |
| 5,701,699 A | 12/1997 | Carlson et al. | |
| 5,732,505 A | 3/1998 | Carlson et al. | |
| 5,771,632 A | 6/1998 | Liu et al. | |
| 5,784,162 A | 7/1998 | Cabib et al. | |
| 5,799,439 A | 9/1998 | MacGregor | |
| 5,821,126 A | 10/1998 | Durzan et al. | |
| 5,842,150 A | 11/1998 | Renberg et al. | |
| 5,877,850 A | 3/1999 | Ogata | |
| 5,930,803 A | 7/1999 | Becker et al. | |
| 5,960,435 A | 9/1999 | Rathmann et al. | |
| 6,021,220 A | 2/2000 | Anderholm | |
| 6,092,059 A | 7/2000 | Straforini et al. | |
| 6,119,395 A | 9/2000 | Hartle et al. | |
| 6,131,973 A | 10/2000 | Trudeau | |
| 6,145,247 A | 11/2000 | McKinnis | |
| 6,470,623 B1 | 10/2002 | Hirahara | |
| 6,567,538 B1 | 5/2003 | Pelletier | |
| 6,582,159 B2 | 6/2003 | McKinnis | |
| 6,641,893 B1 * | 11/2003 | Suresh et al. | 428/105 |
| 2002/0192686 A1 | 12/2002 | Adorjan et al. | |
| 2003/0055615 A1 | 3/2003 | Zhang et al. | |

FOREIGN PATENT DOCUMENTS

| | | |
|---|---|---|
| CA | 1250296 | 2/1989 |
| EP | 0 107 141 A1 | 5/1984 |
| EP | 0 300 730 A1 | 1/1989 |
| EP | 0 380 692 A1 | 8/1990 |
| EP | 0 511 936 A1 | 11/1992 |
| EP | 0776601 A1 | 6/1997 |
| FR | 2 653 334 A1 | 3/1991 |
| FR | 2 680 951 A1 | 3/1993 |
| JP | 61040708 | 2/1986 |
| JP | 62275604 | 11/1987 |
| JP | 63133904 | 6/1988 |
| JP | 63152905 | 6/1988 |
| JP | 2-46240 | 2/1990 |
| JP | 407179683 A | 7/1995 |
| WO | WO 91/00781 A1 | 1/1991 |
| WO | WO 91/01803 | 2/1991 |
| WO | WO 92/07457 A1 | 5/1992 |
| WO | WO 95/05064 | 2/1995 |
| WO | WO 98/33375 | 8/1998 |
| WO | WO 99/26470 | 6/1999 |
| WO | WO 01/13702 A2 | 3/2001 |

OTHER PUBLICATIONS

Adlercreutz, P., and B. Mattiasson, "Oxyegn Supply to Immobilized Cells: 1. Oxygen Production by Immobilized *Chlorella pyrenoidosa*," *Enzyme Microbial Technol.* 4:332-336, 1982.

Adlercreutz, P., and B. Mattiasson, "Oxygen Supply to Immobilized Cells. 3. Oxygen Supply by Hemoglobin or Emulsions of Perfluorochemicals," *Eur. J. Appl. Microbiol. & Biotechnol.* 16:165-170, 1982.

Bapat, V.A., "Studies on Synthetic Seeds of Sandalwood (*Santalum album L.*) and Mulberry (*Morus indica L.*)," in K. Redenbaugh (ed.), *Synseeds: Applications of Synthetic Seeds to Crop Improvement*, CRC Press, Inc., Boca Raton, Fla., 1993, pp. 381-407.

Bapat, V.A., and P.S. Rao, "In Vivo Growth of Encapsulated Axillary Buds of Mulberry (*Morus indica L.*),"*Plant Cell, Tissue and Organ Culture* 20:69-70, 1990.

Bapat, V.A., and P.S. Rao, "Sandalwood Plantlets from 'Synthetic Seeds,'" *Plant Cell Reports* 7:434-436, 1988.

Buchenauer, H., "Mode of Action and Selectivity of Fungicides Which Interfere with Ergosterol Biosynthesis," *Proceedings of the 1977 British Crop Protection Conference—Pests and Diseases*, Brighton, U.K., 1977, pp. 699-711.

Chandler, D., et al., "Effects of Emulsified Perfluorochemicals on Growth and Ultrastructure of Microbial Cells in Culture," *Biotechnol. Letters* 9(3):195-200, 1987.

Cheng, Z., and P.P. Ling, "Machine Vision Techniques for Somatic Coffee Embryo Morphological Feature Extraction," *American Society of Agricultural Engineers* 37(5):1663-1669, 1994.

Chi, C.-M., et al., "An Advanced Image Analysis System for Evaluation of Somatic Embryo Development," *Biotechnology and Bioengineering* 50:65-72, Apr. 996.

Clark, Jr., L.C., et al., "Emulsions of Perfluoronated Solvents for Intravascular Gas Transport," *Fed. Proceed.* 34(6):1468-1477, 1975.

Clark, Jr., L.C., et al., "The Physiology of Synthetic Blood," *J.Thorac. & Cardiovasc. Surg.* 60(6):757-773, 1970.

Damiano, D., and S.S. Wang, "Novel Use of Perfluorocarbon for Supplying Oxygen to Aerobic Submerged Cultures," *Biotechnol. Letters* 7(2):81-86, 1985.

Datta, S.K., and I. Potrykus, "Artifical Seeds in Barley: Encapsulation of Microspore-Derived Enbryos," *Thero. Appl. Genet.* 77:820-824, 1989.

Dumet, D., et al., "Cryopreservation of Oil Palm (*Elaeis guincesis Jacq.*) Somatic Embryos Involving a Desiccation Step," *Plant Cell Reports* 12:352-355, 1993.

Dupuis, J.-M., et al., "Pharmaceutical Capsules as a Coating System for Artificial Seeds," *Bio/Technol.* 12:385-389, 1994.

Ebert, W.W., and P.F. Knowles, "Inheritance of Pericarp Types, Sterility, and Dwarfness in Several Safflower Crosses," *Crop Science* 6:579-582, 1966.

Fujii, A., et al., "Artificial Seeds for Plant Propagation," *Trends in Bio/Technol.* 5:335-339, 1987.

Fujii, J., et al., "ABA Maturation and Starch Accumulation in Alfalfa Somatic Embryos" (Abstract), In Vitro 25 (3, Part 2):61A, 1989.

Fujii, J., et al., "Improving Plantlet Growth and Vigor From Alfalfa Artificial Seed" (Abstract), In Vitro 24 (3, Part 2):70A, 1989.

Fujita, T., et al., "Fluorocarbon Emulsion as a Candidate for Artificial Blood," *Europ. Surg. Res.* 3:436-453, 1971.

Geyer, R.P., "'Bloodless' Rats Through the Use of Artificial Blood Substitutes," *Fed. Proceed* 34(6):1499-1505, 1975.

Gray, D.J., and A. Purohit, "Somatic Embryogenesis and Development of Synthetic Seed Technology," *Crit. Rev. Plant Sci. 10*(1):33-61, 1991.

Grob, J.A., et al., "Dimensional Model of Zygotic Douglas-Fir Embryo Development," *International Journal of Plant Sciences 160*(4):653-662, 1999.

Gupta, P.K., and D.J. Durzan, "Biotechnology of Somatic Polyembryogenesis and Plantlet Regeneration in Loblolly Pine," *Bio/Technol. 5*:147-151, 1987.

Ibarbia, E.A., "Synthetic Seed: Is It the Future," *Western Grower and Shipper 59*:12, 1988.

Janick, J., "Production of Synthetic Seed via Desiccation and Encapsulation" (Abstract), In Vitro 24(3, Part 2):70A, 1988.

Kamada, H., et al., "New Methods for Somatic Embryo Induction and Their Use of Synthetic Production" (Abstract), In Vitro 24(3, Part 2):71A, 1988.

Kim YH, "ABA and Polyox-Encapsulation or High Humidity Increases Survival of Desiccated Somatic Embryos of Celery," *HortScience 24*(4):674-676, 1989.

King, A.T., et al., "Perfluorochemicals and Cell Culture," *Biotechnol. 7*:1037-1042, 1989.

Kitto, S.L., and J. Janick, "A Citrus Embryo Assay to Screen Water-Soluble Resins as Synthetic Seed Coats," *HortScience 20*(1):98-100, 1985.

Kitto, S.L., and J.Janick, "Production of Synthetic Seeds by Encapsulating Asexual Embryos of Carrot," *J. Amer. Soc. Hort. Sci. 110*(2):227-282, 1985.

Li, X.-Q., "Somatic Embryogenesis and Synthetic Seed Technology Using Carrot as a Model System," in K. Redenbaugh (ed.), *Synseeds: Applications of Synthetic Seeds to Crop Improvement*, CRC Press, Inc., Boca Raton, Fla., 1993, pp. 289-304.

Mattiasson, B., and P. Adlercreutz, "Use of Perfluorochemicals for Oxygen Supply to Immobilized Cells," *Ann. N.Y. Acad. Sci. 413*:545-547, 1984.

Paulet, F., et al., "Cryopreservation of Apices of In Vitro Plantlets of Sugarcane (*Saccharum* sp. Hybrids) Using Encapsulation/Dehydration," *Plant Cell Reports 12*:525-529, 1993.

Redenbaugh, K., et al., "Encapsulated Plant Embryos," *Biotechnology in Agriculture*, 1988, pp. 225-248.

Redenbaugh, K., et al., "Encapsulation of Somatic Embryos for Artificial Seed Production" (Abstract), In Vitro 20(2):256-257, 1984.

Redenbaugh, K., et al., "Encapsulation of Somatic Embryos in Synthetic Seed Coats," *HortScience 22*(5):803-809, 1987.

Redenbaugh, K., et al., "III.3 Artificial Seeds—Encapsulated Somatic Embryos," *Biotech. in Agr. & For. 17*:395-416, 1991.

Redenbaugh, K., et al., "Scale-Up: Artificial Seeds," in Green et al. (eds.), *Plant Tissue and Cell Culture*, Alan R. Liss, Inc., New York, 1987, pp. 473-493.

Redenbaugh, K., et al., "Somatic Seeds: Encapsulation of Asexual Plant Enbryos," *Bio/Technology 4*:797-801, 1986.

Riess, J.G., and M. Le Blanc, "Perfluoro Compounds as Blood Substitutes," *Angew. Chem. Int. Ed. Engl. 17*(9):621-634, 1978.

Rogers, M., "Synthetic-Seed Technology, " *Newsweek*, Nov. 28, 1983.

Sanada, M., et al., "Celery and Lettuce," in M.K. Redenbaugh (ed.), *Synseeds: Applications of Synthetic Seeds to Crop Improvement*, CRC Press, Inc., Boca Raton, Fla., 1993, pp. 305-322.

Senaratna, T., "Artificial Seeds," *Biotech Adv. 10*(3)379-392, 1992.

Sharma SK et al., "Novel Compositions of Emulsified Perfluorocarbons for Biological Applications," *Brit. J. Pharmacol. 89*:665P, 1986.

Stuart, D.A., and M.K. Redenbaugh, "Use of Somatic Embryogenesis for the Regeneration of Plants," in H.M. LeBaron et al. (eds.), *Biotechnology in Agricultural Chemistry*, American Chemical Society, Washington D.C., 1987, pp. 87-96.

Teasdale, R.D., and P.A. Buxton, "Culture of *Pinus radiata* Embryos With Reference to Artificial Seed Production," *New Zealand J. For. Sci. 16*(3):387-391, 1986.

Tessereau, H. et al., "Cryopreservation of Somatic Embryos: A Tool for Germplasm Storage and Commercial Delivery of Selected Plants," *Ann. Bot. 74*:547-555, 1994.

Timmis, R., "Bioprocessing for Tree Production in the Forest Industry: Conifer Somatic Embryogenesis," *Biotechnology Progress 14*(1):156-166, 1998.

Weyerhaeauser, G.H., "Biotechnology in Forestry: The Promise and the Economic Reality" *Solutions! for People, Processes and Paper 86*(10):28-30, Oct. 2003.

Bodig J et al, "Mechanics of Wood and Wood Composites," Ch. 3 *Orthotropic Elasticity* and Ch 8, *Layered Systems*, Kreiger Publishing Co., 1982.

* cited by examiner

ORIENTED STRAND BOARD PANEL HAVING IMPROVED STRAND ALIGNMENT AND A METHOD FOR MAKING THE SAME

FIELD OF THE INVENTION

This invention relates generally to an oriented strand board panel having improved strand alignment. More specifically, the panel has three adjacent layers having strands aligned in different directions successively. The three layers are a top surface layer, a core layer underneath the top surface layer, and a bottom surface layer underneath the core layer. Additional top and/or bottom cover layers are attached to the panel. A strand alignment for the cover layers is, on average, closer to a longitudinal axis of the cover layer than a strand alignment for the surface layers. An improvement in strand alignment provides greater stiffness and/or strength to the panel.

BACKGROUND OF THE INVENTION

Oriented strand board ("OSB") has been manufactured since approximately 1978 and typically includes three to four layers of wood flakes or strands which are compressed to create a panel. Wood flakes or strands are removed from whole logs and placed in wet bins. The strands are then dried to an appropriate moisture content and treated with additives, such as a resin and/or a wax. Next, the strands are formed into a mat during which time they are oriented, or aligned, in a selected direction for each layer. To accomplish this, a device known as a "former" drops strands onto a screen from a small height. In some applications, no screen is provided and the former drops strands directly onto a conveyor belt running below a series of formers. Typically, formers are positioned similar to an assembly line to deposit the strands prior to compression.

A typical panel has a first layer, often referred to as a "top surface" layer which has strands aligned in a longitudinal direction, or, along a longitudinal axis of the layer. A second layer, referred to as a "core" layer, is placed underneath the top surface layer. The core layer may be the product of two sub-layers of deposited strands. The strands of the core layer are aligned in a direction non-parallel to the strands of the top surface mat. Typically, the strands are aligned in a direction perpendicular to the strands of the top surface layer. A third layer, referred to as a "bottom surface" layer, is underneath the core layer and has strands which are aligned substantially parallel to the top surface layer. If the longitudinal direction of the layers is considered as a major axis defining a normal line, then, on average, the strands for the top surface layer and the bottom surface layer deviate from the normal line at a positive/negative 15 to 30 degree angle. This measurement is referred to as a "strand angle" for the layer. For example, a strand angle of 20 degrees would refer to a layer having an average deviation of positive/negative 20 degrees from the normal.

Aligned strands of a layer may be considered similar in property to grain in a wood sample. It is generally known that wood is stiffer and stronger in the grain direction. For example, a wood sample may bear a heavier load that is applied in a direction parallel to the grain than a load applied in a direction non-parallel to the grain. In an oriented strand board panel, each successive layer contains strands which are aligned in a different direction. Therefore, OSB panels have no uniform orientation for the strands as demonstrated by grain in a natural wood. As a result, an OSB panel may bear loads applied in a variety of directions.

Although OSB panels exhibit considerable stiffness when bearing loads, it is desirable to produce OSB panels having increased stiffness to, for example, provide less deflection under a load. One possible solution is to align a greater number of strands in the top surface and/or bottom surface substantially parallel to the longitudinal axis of the layers. One proposed method of achieving this goal is to place discs or vanes within formers closer together to force the strands to drop onto a conveyor belt in a more uniform orientation. However, positioning the discs closer would cause a plug to form between the discs or vanes. This would create a slowdown or stoppage in the production of panels. To prevent this, a manufacturer could reduce the flow of strands to formers; however, this is also undesirable because it leads to less productivity. Most importantly, aligning additional strands at an angle substantially parallel to the longitudinal direction of the top surface layer and/or the bottom surface layer results in fewer strands aligned in a non-parallel direction. The end result is significantly decreased strength in the non-parallel direction of the panel.

A need, therefore, exists for an oriented strand board panel having improved strand alignment with respect to a longitudinal axis of a panel wherein properties of the panel are not significantly compromised in a direction non-parallel to the major axis.

SUMMARY OF THE INVENTION

The present invention provides an oriented strand board panel having improved strand alignment and a method for making the same. The panel has three layers having strands aligned on each of the layers. A top surface layer has strands aligned with respect to a longitudinal axis. A core layer, beneath the top surface layer, has strands aligned in a direction non-parallel to the strands of the top surface layer. A bottom surface layer, beneath the core layer, has strands which are substantially parallel to the strands of the top surface layer.

Overall orientation of the strands in the top surface layer and the bottom surface layer is approximately positive/negative 15 to 30 degrees from a normal axis defined by a longitudinal direction of the layers. In an embodiment, cover layers are placed adjacent to the top surface layer and/or adjacent to the bottom surface layer. The cover layers have a strand angle which is less than the strand angle of the top surface layer and the bottom surface layer. Accordingly, the panel demonstrates greater stiffness and strength in a direction parallel to the longitudinal direction or axis of the panel while maintaining properties in a non-parallel direction.

To provide a greater degree of alignment or a smaller strand angle, strands used to create the cover layers are placed on the top surface layer or underneath the bottom surface layer and may be pre-selected based on a length which facilitates optimum alignment. For example, in an embodiment, a user may determine that the length of the strands which will be utilized in forming the cover layers will be four inches in length. Accordingly, the user may screen the strands to ensure the strands comply with the length requirement. Strands of equal size may become similarly aligned after displacement from a former. In another embodiment, a former or other forming device may be configured to promote improved alignment of the pre-selected or screened strands. For example, the former may have discs which are set a certain distance apart to enable improved alignment of a plurality of a certain size of strand. The improved alignment in the cover layers has a direct impact on stiffness and strength of the panel.

In an embodiment, the panel has a top surface layer having a substantially planar body comprised of a plurality of wood-based strands. The plurality of wood-based strands have an alignment which deviates from a longitudinal direction or longitudinal axis of the top surface layer at a first strand angle. A core layer is adjacent to the top surface layer. The core layer comprises a plurality of wood-based strands having an alignment in a direction non-parallel to the longitudinal axis of the top surface layer. A bottom surface layer is adjacent to the core layer. The bottom surface layer has a plurality of wood-based strands having an alignment which deviates from a longitudinal direction or longitudinal axis of the top surface layer at a second strand angle. A first cover layer is adjacent to the top surface layer. The first cover layer has a plurality of wood-based strands having an alignment which deviates from a longitudinal direction or longitudinal axis of the top surface layer at a third strand angle. The third strand angle is less than the first strand angle and the second strand angle.

It is, therefore, an advantage of the present invention to provide an oriented strand board panel having improved strand alignment and a method for making the same wherein the panel provides greater stiffness and strength than known OSB panels.

It is a further advantage of the present invention to provide an oriented strand board panel having improved strand alignment and a method for making the same wherein stiffness and strength of the panel is increased in a direction parallel to a longitudinal axis of the panel without significant compromise of strength, stiffness, or other properties in a non-parallel axis.

Additional features and advantages of the present invention are described in, and will be apparent from, the detailed description of the present embodiments and from the drawings.

BRIEF DESCRIPTION OF THE DRAWINGS

The embodiments of the present invention are described in detail below with reference to the following drawings.

DETAILED DESCRIPTION OF THE INVENTION

The present invention relates to an oriented strand board panel and a method for making the same. More specifically, the present invention provides an OSB panel which may have, for example, six layers. Four inner layers may have strands aligned in successively non-parallel directions along each layer. A strand angle, or average deviation from the longitudinal axis, for the inner layers may be in a range from positive/negative 15 degrees to 30 degrees. Outer layers may have a higher percentage of strands aligned more closely to a longitudinal axis of the panel than demonstrated in the inner layers. Put another way, the strand angle of the outer layers may be less than that of the inner layers. Accordingly, the panel may have increased stiffness and strength in a direction parallel to the longitudinal axis of the outer layer without significant compromise of stiffness and strength of the panel in a non-parallel direction.

Figure 1:
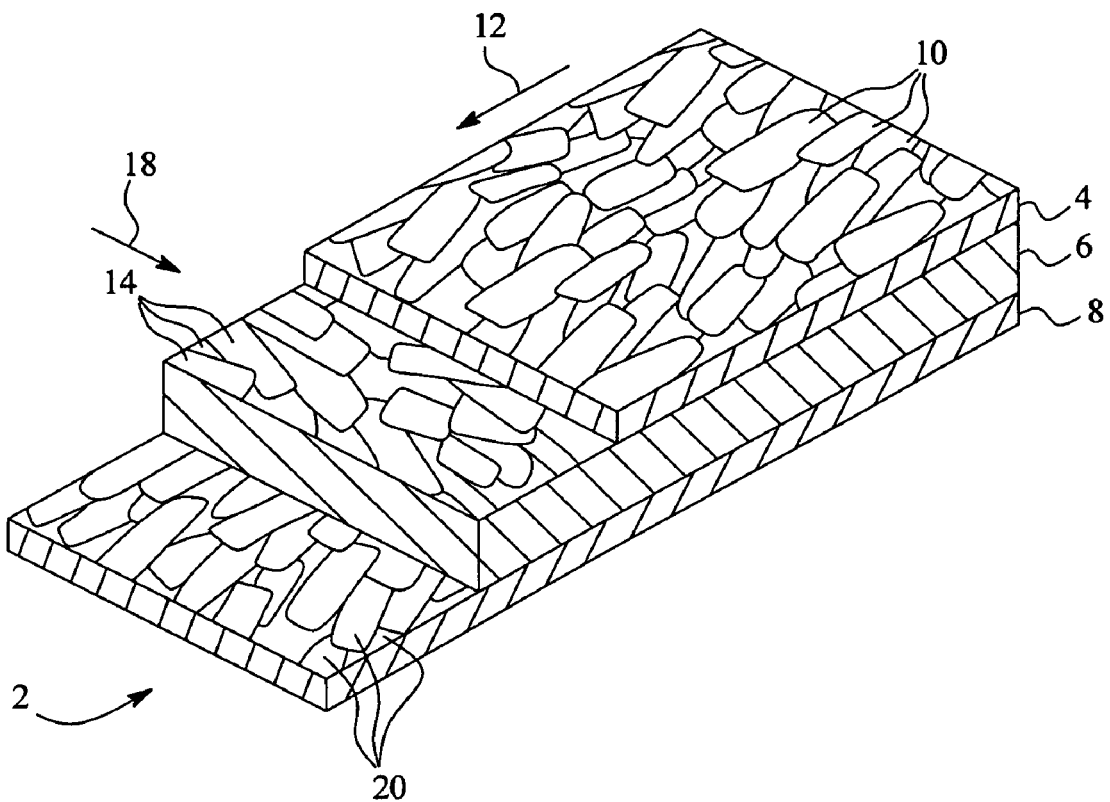
FIG. 1 is a perspective view of layers which are compressed to form an oriented strand board according to the prior art.

Referring now to the drawings wherein like numerals refer to like parts, FIG. 1 illustrates an oriented strand board panel 2 according to the prior art. The panel 2 may have a top surface layer 4 which is positioned on a core layer 6. A bottom surface layer 8 may be positioned below the core layer 6. The layer 4 has strands 10 aligned with a longitudinal direction or longitudinal axis of the layer 4, indicated by arrow 12. Not every strand 10 is perfectly aligned with the longitudinal direction/axis. Accordingly, a strand angle, or average deviation from the longitudinal direction/axis, is approximately positive/negative 15 degrees to 30 degrees. The layer 6 has strands 14 aligned substantially parallel to a direction indicated by arrow 18. As seen in FIG. 1, the arrows 12 and 18 are aligned in different directions, indicating that the general directions of strand alignment for the layer 4 and the layer 6 are different. In an embodiment, the strand alignment of layer 4 is perpendicular to the strand alignment of the layer 6. The layer 8 has strands 20 which are aligned substantially parallel to a longitudinal direction or longitudinal axis of the layer 8, indicated by arrow 22. The alignment of strands 20 on the layer 8 is substantially parallel to the strand alignment of the layer 4. A strand angle for the layer 8 is approximately positive/negative 15 degrees to 30 degrees with respect to the longitudinal direction or longitudinal axis of the layer 8. With respect to a total number of strands N required to create the panel 2, layer 4 may have approximately 27% of strands by weight; layer 6 may have 46% by weight; and layer 8 may have 27% by weight.

Figure 2:
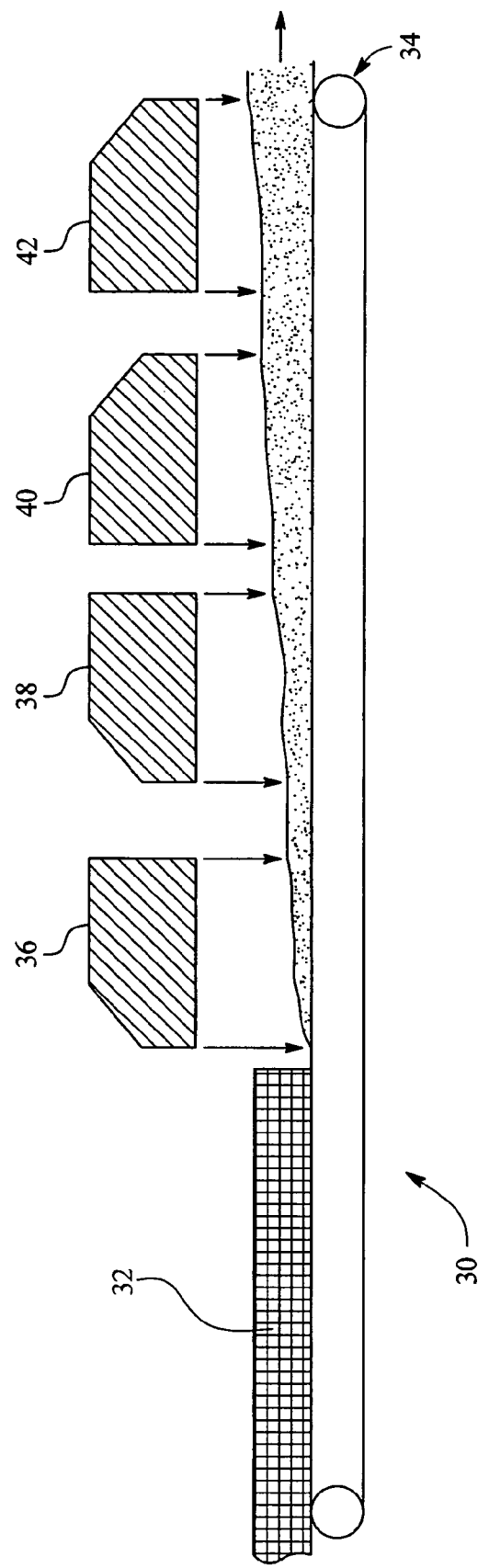
FIG. 2 is a side view of forming devices which assist in aligning strands of an oriented strand board panel according to the prior art.
Figure 4:
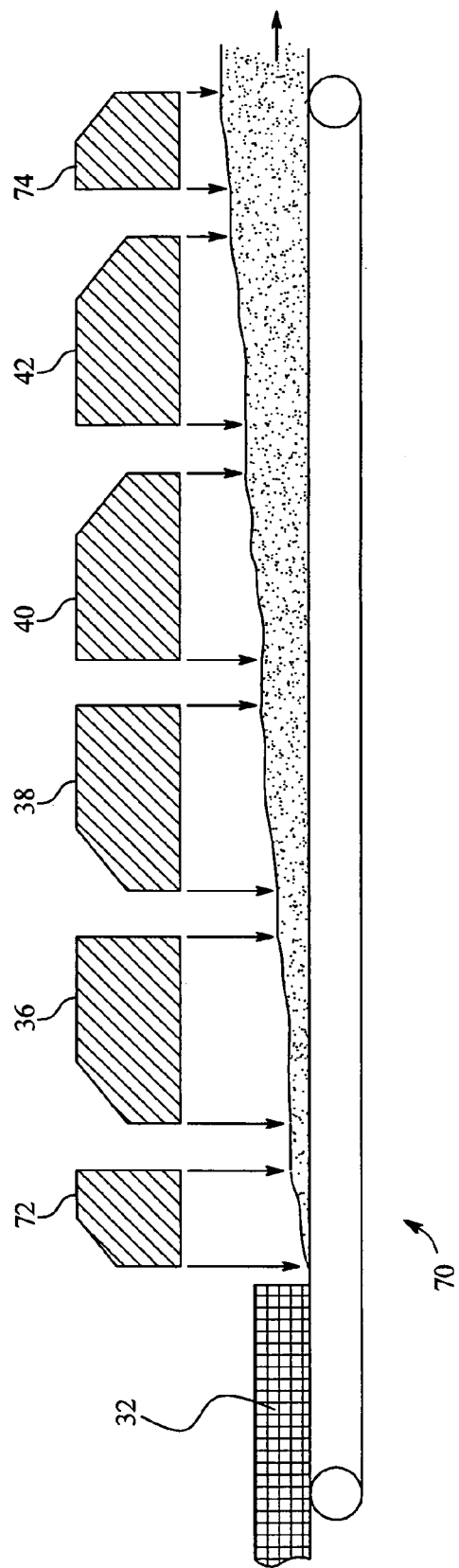
FIG. 4 is a side view of forming devices which assist in aligning strands of an oriented strand board panel in an embodiment of the present invention.

FIG. 2 illustrates a prior art system 30 which is utilized to provide strand alignment for the layers 4, 6, 8. A screen 32 is delivered across a conveyor line 34 and is positioned underneath a first former, or forming device 36. The screen 32 is laid horizontally, or parallel to the conveyor line 34. FIGS. 2 and 4 merely illustrate the screen 32 as shown to allow the reader to conceptualize a typical surface of the screen 32 onto which strands may be deposited. In another embodiment, no screen is utilized, and the strands are deposited directly onto the conveyor line 34. Strands are deposited from the device 36 onto the screen 32 in a pre-selected alignment to form a bottom surface layer in a manner understood by those skilled in the art. The screen 32 is then moved along the conveyor line 34 until it is positioned underneath a second forming device 38. Strands are deposited from the device 38 to form a first portion of the core layer. The screen 32 is then moved along the conveyor line 34 until it is positioned underneath a third forming device 40 which deposits strands to form a second portion of the core layer. The screen 32 then moves along the conveyor line 34 until it is positioned underneath a fourth forming device 42 which deposits strands to form a top surface layer. Eventually, the layers are compressed to form a wood product, such as a panel. Typical feed rates for strands deposited from the forming devices 36, 38, 40, 42 is in a range from 15,000 to 30,000 pounds per hour. At such a rate, a manufacturer is limited in its ability to control flake alignment. Thus, a strand angle, or deviation from a longitudinal axis of a layer, is typically in a range from positive/negative 15 to 30 degrees.

Figure 3:
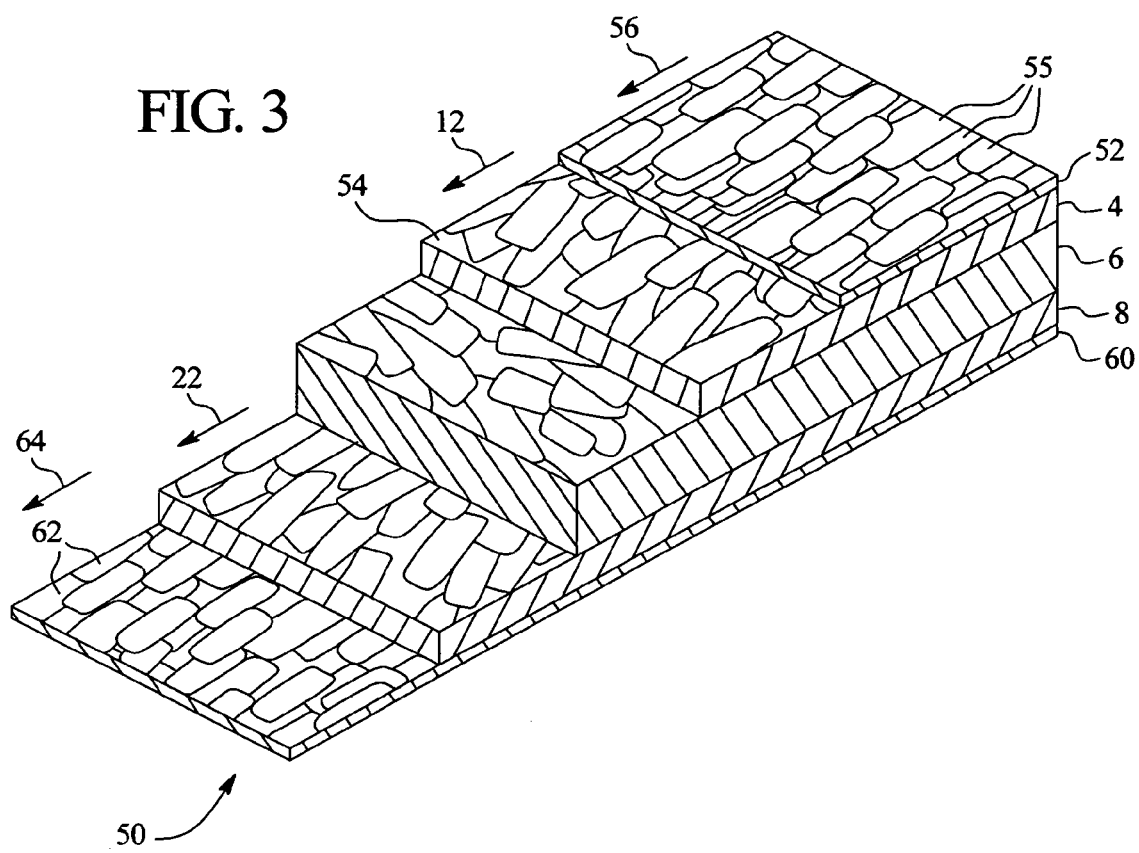
FIG. 3 is a perspective view of layers of an oriented strand board panel in an embodiment of the present invention.

FIG. 3 illustrates an oriented strand board panel 50 of the present invention. The panel has layers 4, 6, 8 which may each have a strand angle in a range from positive/negative 15 to 30 degrees. A cover layer 52 may contact a top surface 54 of the layer 4. The cover layer 52 may have strands 55 which are aligned substantially parallel to a longitudinal direction or longitudinal axis of the layer 52, indicated by arrow 56. A strand angle for the cover layer 52 may be less than strand angles for the layers 4, 6, 8. As shown in the figure, the arrow 56 is substantially parallel to the arrow 12. In an embodiment, the strand angle may be in a range from 0 degrees to positive/negative 15 degrees. A cover layer 60 may be positioned below the layer 8 and may have strands 62 aligned substantially parallel to a longitudinal direction or longitudinal axis of the layer 60, indicated by arrow 64. A strand angle for the layer 60 may be in a range from 0 degrees to positive/negative 15 degrees. As seen in the figure, the arrow 64 is substantially parallel to the arrow 22.

In this embodiment, with respect to a total number of strands required to create the panel 50, the layer 52 may have approximately 5% of strands by weight; layer 4 may have approximately 22% of strands by weight; layer 6 may have 46% by weight; layer 8 may have 22% by weight; and layer 60 may have 5% by weight. Other embodiments are also contemplated, such as, for example, an embodiment in which the layer 52 may have approximately 2.5% of strands by weight; layer 4 may have approximately 24.5% of strands by weight; layer 6 may have 46% by weight; layer 8 may have 24.5% by weight; and layer 60 may have 2.5% by weight. Any other distributions suitable for construction of an OSB product are contemplated. In this respect, a total number of strands used to create the panel 50 may be the same as demonstrated in prior art panels. However, a portion of strands used to create one of, or both of, the surface layers is allocated to create the cover layers. For example, the panel 2 and the panel 50 may contain a same or substantially same number of strands, or may have a same or substantially same weight. However, a distribution to individual layers 52, 4, 6, 8, 60 may differ.

FIG. 4 illustrates a system 70 which may be utilized to manufacture the panel 50. The system includes the formers, or forming devices 36, 38, 40, 42, which provide the layers 4, 6, 8. A forming device 72 is provided within the system adjacent to the forming device 36. The forming device 72 deposits strands onto the screen 32 to provide the cover layer 60 which is seen in FIG. 3. A forming device 74 is provided adjacent to the forming device 42. The forming device 74 deposits strands onto the screen 32 to provide the cover layer 52.

Feed rates for the forming devices 72, 74 may be in a range from 1,000-10,000 pounds per hour. In an embodiment, the strands may be screened for a desired length, as strands of a similar length may have a tendency to be deposited onto the screen 32 according to a similar alignment. For example, the strands incorporated within the layers 52, 60 may be, on average, approximately four inches in length and may be screened prior to placement on the screen 32 or conveyor belt 34. Additional selected or desired properties of the strands include, for example, strand width. Although a length of four inches is described, any average length for the strands is contemplated which is suitable for forming a layer, such as a length in a range from 2 inches to 8 inches. A slower feed rate, such as that described above, and/or a consistency in length between the strands may provide a manufacturer with greater control over the alignment of strands. In an embodiment, the forming devices 72, 74 may be configured to promote improved alignment of the pre-selected or screened strands. For example, the forming devices 72, 74 may have discs which are set a certain distance apart to enable improved alignment of a plurality of a certain size of strand.

Various tests were conducted to compare properties of panels of the prior art with those of the present invention. FIGS. 5-8 illustrate the results obtained from those tests. Prior art panels, or control panels (denoted C1 and C2), had an average strand angle of positive/negative 15 to 30 degrees in the surface layers. Panels of the present invention are identified as "I1" and "I2". Panel I1 has 10 percent of strands by weight displaced along the top cover layer and the bottom cover layer. More specifically, each cover layer has about 5 percent of the total strands for the panel with each cover layer having a strand angle which is less than each of the surface layers. Panel I2 has 5 percent of strands on the cover layers, i.e., 2.5% of the strands are on each cover layer and have a strand angle which is less than that of each of the surface layers.

Figure 5:
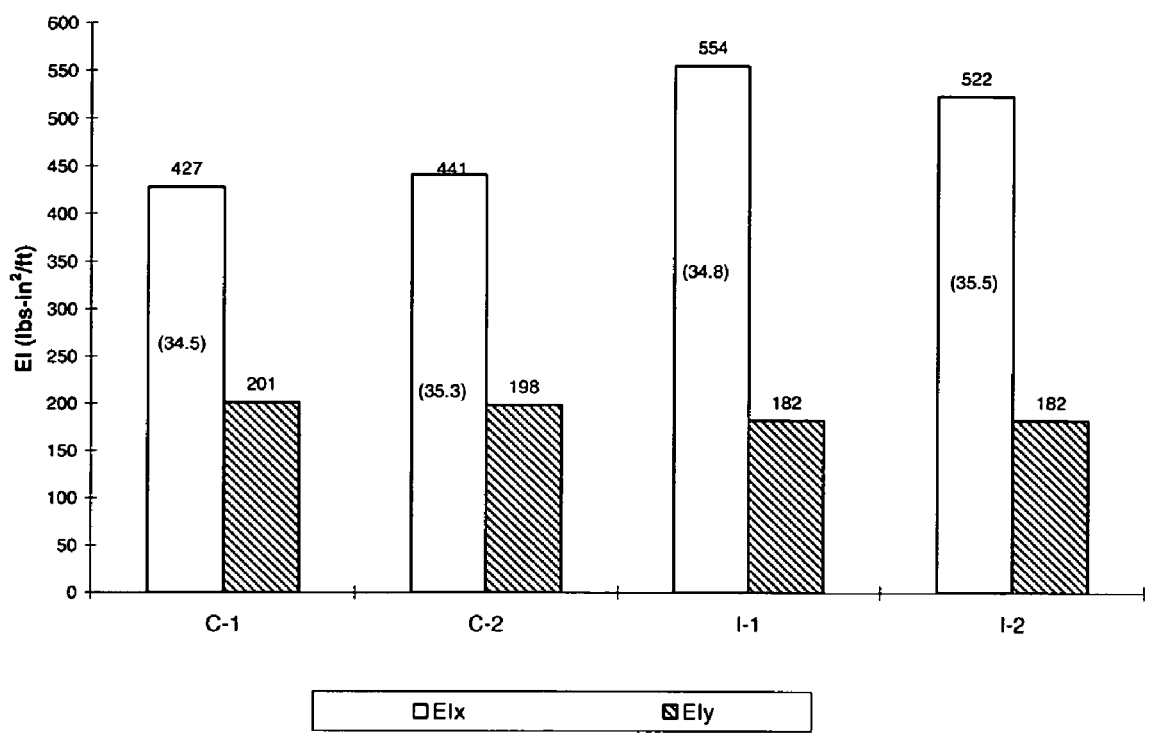
FIG. 5 is a graph illustrating a stiffness comparison between prior art OSB panels and OSB panels of the present invention on a full scale.

FIG. 5 illustrates results obtained in a stiffness comparison between oriented strand board panels of the prior art (C1, C2) and oriented strand board panels of the present invention (I1, I2) on a full scale. As seen in the graph, panels I1 and I2 demonstrated significantly greater stiffness in a parallel, or strong direction of the panel. More specifically, panel I1 was 28% stiffer in a strong direction and panel I2 was 26% stiffer. The panels of the present invention demonstrated only slightly less strength in a non-parallel direction. For example, panels I1 were each only 9% less stiff in the non-parallel direction. Moreover, the data in FIG. 5 demonstrate that the weights/densities of the control panels and panels of the present invention are essentially similar. Therefore, it may be construed that the difference in stiffness is due to strand alignment and not weight/density differences.

Figure 6:
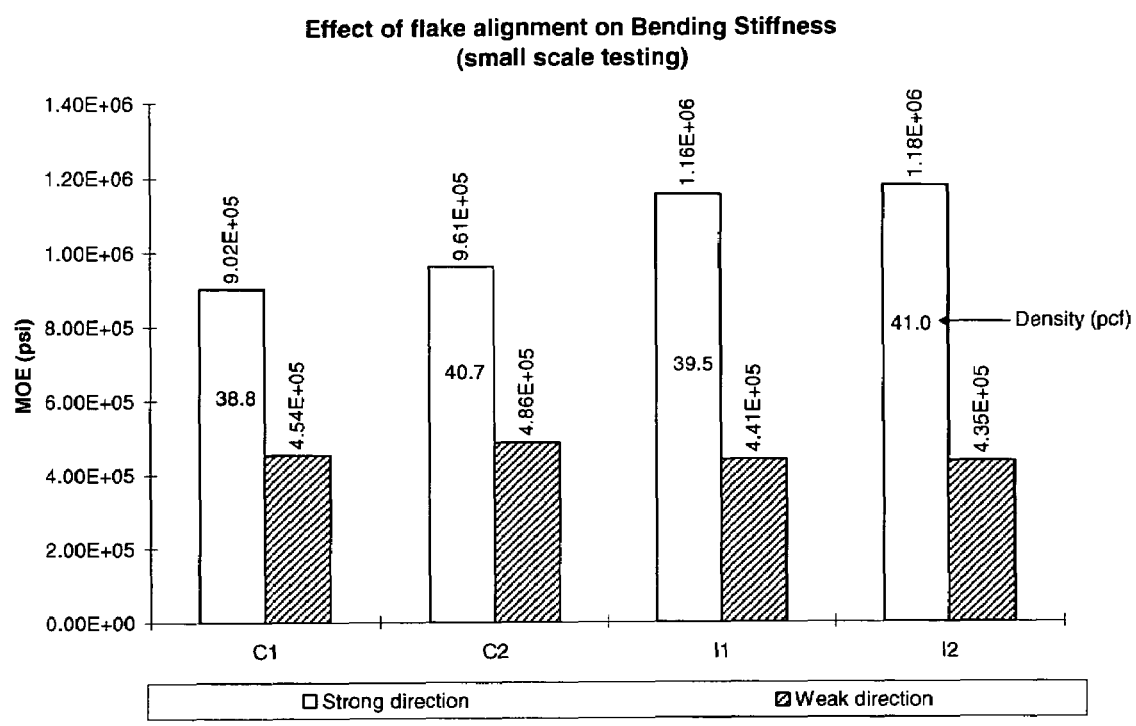
FIG. 6 is a graph illustrating a stiffness comparison between prior art OSB panels and OSB panels of the present invention on a small scale.

FIG. 6 illustrates a bending stiffness, or modulus of elasticity, comparison between panels C1, C2 and panels I1, I2 on a small scale. Panel I1 was 25% stiffer in a strong direction while panel I2 was 27% stiffer. In a weak direction, panel I1 was only 6% less stiff than panels C1 and C2 and panel I2 was only 7% less stiff. Panel I2 demonstrated greater stiffness than panel I1 although only 5% of strands in panel I2 had improved alignment. This difference, contrary to the above example in FIG. 5, may be a result of differing densities between the panels of the present invention.

Figure 7:
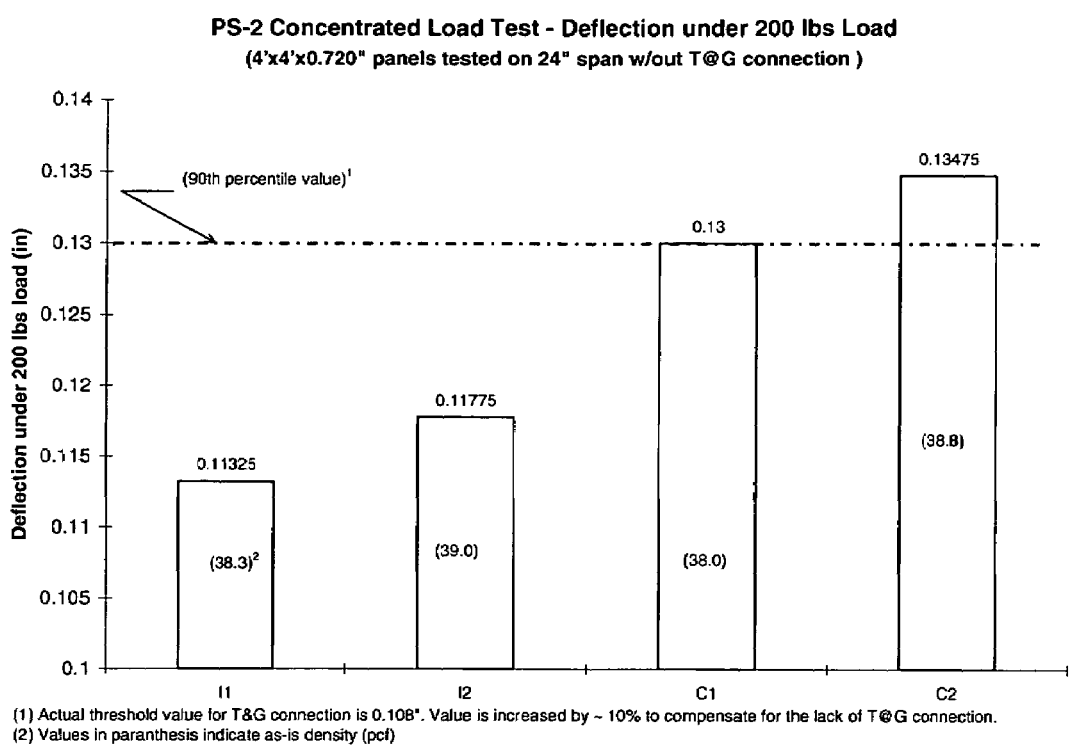
FIG. 7 is a graph illustrating a stiffness comparison between prior art OSB panels and OSB panels of the present invention utilizing a PS-2 concentrated load test.

FIG. 7 illustrates a comparison of results obtained from administering a PS-2 Concentrated Load Test in which the panels C1, C2, I1, I2 received a 200 pound load. Panels I1 and I2 demonstrated less deflection under the load. In fact, panel I1 had 14% less deflection under the load and panel I2 had 11% less deflection. Because densities (not shown) of the control panels and panels of the present invention are essentially similar, it can be construed that the difference in stiffness is due to strand alignment and not density differences.

Figure 8:
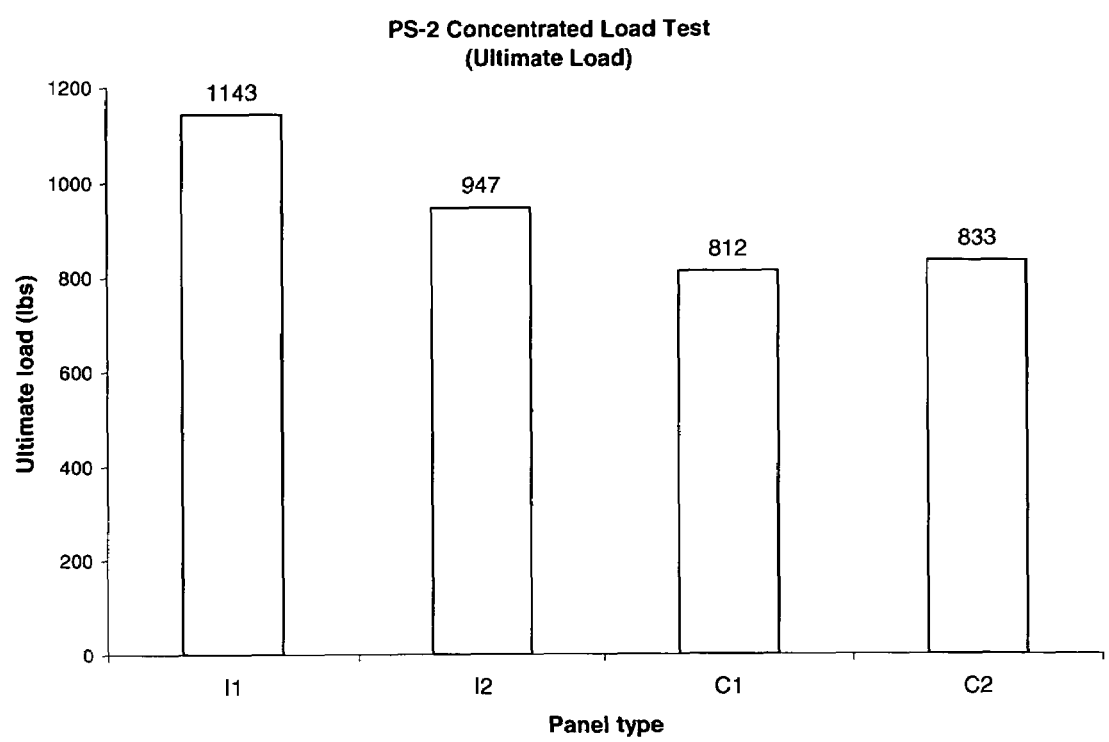
FIG. 8 is a graph illustrating a strength comparison between prior art OSB panels and OSB panels of the present invention utilizing a PS-2 concentrated load test.

FIG. 8 illustrates results obtained when panels were subjected to a PS-2 Concentrated Load Test to determine an ultimate load which could be applied to the panels. The panels measured 4 feet by 4 feet with a thickness of 0.72 inches. In addition, the panels were tested on a 24" span absent any tongue and groove connection. Panels C1 and C2, on average, were able to sustain an ultimate load of 822.5 pounds. However, panel I2 sustained a load of 947 pounds which demonstrates a 15% increase in strength. Moreover, panel I1 sustained a load of 1143 pounds which demonstrates a 39% increase in strength. The increases in strength are the result of flake alignment and not density differences in comparison to the control panels.

The above results demonstrate that panels of the present invention are stiffer and stronger than prior art panels. Accordingly, a manufacturer may be able to provide such a panel without requiring a slowdown in productivity during the manufacturing process. A manufacturer would also avoid hazards such as, for example, plugging of discs and/or vanes during the forming process. Moreover, because additional cover layers with improved alignment provide greater strength and stiffness, a manufacturer could potentially provide panels having stiffness/strength comparable to prior art OSB panels while utilizing a lesser amount of strands than demonstrated in prior art OSB panels. This would reduce costs associated with manufacturing the panels, including costs associated with an amount of raw materials required to produce a panel.

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

What is claimed is:

1. An oriented strand board panel comprising:
   a top surface layer having a substantially planar body comprised of a plurality of wood-based strands wherein the plurality of wood-based strands has a first strand angle defined by an average deviation from a longitudinal axis of the top surface layer wherein the first strand angle is approximately positive/negative 15 degrees to 30 degrees, and wherein the top surface layer has a top surface strand density;
   a core layer adjacent to the top surface layer wherein the core layer comprises a plurality of wood-based strands having an alignment in a direction non-parallel to the longitudinal axis of the top surface layer, wherein the core layer has a core layer strand density that is-greater than the top surface layer strand density;
   a bottom surface layer adjacent to the core layer wherein the bottom surface layer has a plurality of wood-based strands wherein the plurality of wood-based strands has a second strand angle defined by an average deviation from a longitudinal axis of the bottom surface layer wherein the second strand angle is approximately positive/negative 15 degrees to 30 degrees, and wherein the bottom surface aver has a bottom surface strand density that is less than the core layer strand density; and
   a first cover layer on the top surface layer wherein the first cover layer has a plurality of wood-based strands wherein the plurality of wood-based strands has a third strand angle defined by an average deviation from a longitudinal axis of the first cover layer wherein the third strand angle is less than the first strand angle and the second strand angle.

2. The oriented strand board panel of claim 1 further comprising:
   a second cover layer adjacent to the bottom surface layer wherein the second cover layer has a plurality of wood-based strands wherein the plurality of wood-based strands has a fourth strand angle defined by an average deviation from a longitudinal axis of the second cover layer wherein the fourth strand angle is less than the first strand angle and the second strand angle.

3. The oriented strand board panel of claim 1 wherein the third strand angle is in a range from zero degrees to positive/negative fifteen degrees.

4. The oriented strand board panel of claim 1 wherein the wood-based strands have a length in a range from 2 inches to 8 inches.

5. The oriented strand board panel of claim 1 wherein the top surface layer has more strands than the first cover layer.

6. An oriented strand board panel comprising:
   a top surface layer having a substantially planar body comprised of a plurality of wood-based strands wherein the plurality of wood-based strands has a first strand angle defined by an average deviation from a longitudinal axis of the top surface layer wherein the first strand angle is approximately positive/negative 15 degrees to 30 degrees, and wherein the top surface layer has a top surface strand density;
   a core layer adjacent to the top surface layer wherein the core layer comprises a plurality of wood-based strands having an alignment in a direction non-parallel to the longitudinal axis of the top surface layer, wherein the core layer has a core layer strand density that is greater than the top surface layer strand density;
   a bottom surface layer adjacent to the core layer wherein the bottom surface layer has a plurality of wood-based strands wherein the plurality of wood-based strands has a second strand angle defined by an average deviation from a longitudinal axis of the bottom surface layer wherein the second strand angle is approximately positive/negative 15 degrees to 30 degrees, and wherein the bottom surface layer has a bottom surface strand density that is less than the core layer strand density; and
   a first cover layer adjacent to the bottom surface layer wherein the first cover layer has a plurality of wood-based strands wherein the plurality of wood-based strands has a third strand angle defined by an average deviation from a longitudinal axis of the first cover layer wherein the third strand angle is less than the first strand angle and the second strand angle.

7. The oriented strand board panel of claim 6 further comprising:
   a second cover layer adjacent to the top surface layer wherein the second cover layer has a plurality of wood-based strands wherein the plurality of wood-based strands has a fourth strand angle defined by an average deviation from a longitudinal axis of the second cover layer wherein the fourth strand angle is less than the first strand angle and the second strand angle.

8. The oriented strand board panel of claim 6 wherein the third strand angle is in a range from zero degrees to positive/negative fifteen degrees.

9. The oriented strand board panel of claim 6 wherein the wood-based strands have a length in a range from 2 inches to 8 inches.

10. The oriented strand board panel of claim 6 wherein the bottom surface layer has more strands than the first cover layer.

11. The oriented strand board panel of claim 1, wherein the first cover layer has a first cover layer strand density that is less than the top surface strand density.

12. The oriented strand board panel of claim 1, further comprising a second cover layer on the bottom surface layer.

13. The oriented strand board panel of claim 12, wherein the second cover layer has a plurality of wood-based strands wherein the plurality of wood-based strands has a fourth strand angle defined by an average deviation from a longitudinal axis of the second cover layer.

14. The oriented strand board panel of claim 12, wherein the second cover layer has a second cover layer strand density that is less than the top surface strand density.

15. The oriented strand board panel of claim 6, wherein the first cover layer has a first cover layer strand density that is less than the bottom surface strand density.

16. The oriented strand board panel of claim 6, further comprising a second cover layer on the top surface layer.

17. The oriented strand board panel of claim 16, wherein the second cover layer has a plurality of wood-based strands wherein the plurality of wood-based strands has a fourth strand angle defined by an average deviation from a longitudinal axis of the second cover layer.

18. The oriented strand board panel of claim 16, wherein the second cover layer has a second cover layer strand density that is less than the bottom surface strand density.

* * * * *